United States Patent
Fujishiro et al.

(10) Patent No.: US 11,246,185 B2
(45) Date of Patent: Feb. 8, 2022

(54) RADIO TERMINAL AND BASE STATION

(71) Applicant: KYOCERA Corporation, Kyoto (JP)

(72) Inventors: Masato Fujishiro, Yokohama (JP); Kugo Morita, Yokohama (JP); Mayumi Komura, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 20 days.

(21) Appl. No.: 16/369,149

(22) Filed: Mar. 29, 2019

(65) Prior Publication Data

US 2019/0230737 A1 Jul. 25, 2019

Related U.S. Application Data

(63) Continuation of application No. PCT/JP2017/034905, filed on Sep. 27, 2017.

(60) Provisional application No. 62/402,180, filed on Sep. 30, 2016.

(51) Int. Cl.
| | | |
|---|---|---|
| *H04W 76/19* | (2018.01) | |
| *H04W 88/02* | (2009.01) | |
| *H04W 76/27* | (2018.01) | |
| *H04W 76/18* | (2018.01) | |
| *H04W 76/30* | (2018.01) | |
| *H04W 74/06* | (2009.01) | |
| *H04W 80/02* | (2009.01) | |
| *H04W 76/38* | (2018.01) | |

(52) U.S. Cl.
CPC ......... *H04W 88/023* (2013.01); *H04W 74/06* (2013.01); *H04W 76/18* (2018.02); *H04W 76/19* (2018.02); *H04W 76/27* (2018.02); *H04W 76/30* (2018.02); *H04W 80/02* (2013.01); *H04W 76/38* (2018.02)

(58) Field of Classification Search
None
See application file for complete search history.

(56) References Cited

U.S. PATENT DOCUMENTS

| | | | | |
|---|---|---|---|---|
| 2009/0197589 A1* | 8/2009 | Kitazoe | ................. | H04W 76/25 455/422.1 |
| 2012/0088505 A1* | 4/2012 | Toh | ...................... | H04W 8/186 455/434 |
| 2013/0215834 A1* | 8/2013 | Deivasigamani | ..... | H04W 76/27 370/329 |
| 2013/0260758 A1* | 10/2013 | Zhao | ..................... | H04W 36/14 455/436 |

(Continued)

FOREIGN PATENT DOCUMENTS

| | | |
|---|---|---|
| JP | 2001-177508 A | 6/2001 |
| WO | 2010/143428 A1 | 12/2010 |

*Primary Examiner* — Nicholas Sloms
(74) *Attorney, Agent, or Firm* — Studebaker & Brackett PC (57) ABSTRACT

A radio terminal according to one embodiment comprises: a controller configured to detect a radio problem in communication with a base station in an RRC connected state and attempt a recovery from the radio problem; and a transmitter configured to transmit, to the base station, a polling signal for confirming whether or not the base station considers an RRC state of the radio terminal as the RRC connected state in response to the successful recovery. The controller maintains the RRC connected state in response to reception, from the base station, of a response signal to the polling signal.

4 Claims, 8 Drawing Sheets

(56) References Cited

U.S. PATENT DOCUMENTS

| | | | |
|---|---|---|---|
| 2013/0315119 A1* | 11/2013 | Tabet | H04W 76/28 370/311 |
| 2013/0331057 A1* | 12/2013 | Kodali | H04W 76/19 455/404.1 |
| 2014/0004849 A1* | 1/2014 | Su | H04W 24/08 455/423 |
| 2014/0269637 A1* | 9/2014 | Banister | H04W 76/27 370/336 |
| 2014/0334389 A1* | 11/2014 | Abdel-Samad | H04W 76/30 370/329 |
| 2015/0092554 A1* | 4/2015 | Mochizuki | H04W 28/08 370/235 |
| 2015/0146562 A1* | 5/2015 | Sivanesan | H04L 1/0026 370/252 |
| 2015/0264738 A1* | 9/2015 | Lee | H04W 36/0072 370/228 |
| 2016/0219585 A1* | 7/2016 | Khay-Ibbat | H04W 36/0022 |
| 2017/0196025 A1* | 7/2017 | Chien | H04W 68/02 |
| 2018/0160423 A1* | 6/2018 | Yan | H04W 72/1284 |
| 2019/0191483 A1* | 6/2019 | Ryoo | H04W 76/27 |

\* cited by examiner

RADIO TERMINAL AND BASE STATION

CROSS-REFERENCE TO RELATED APPLICATION

The present application is a continuation based on PCT Application No. PCT/JP2017/034905 filed on Sep. 27, 2017, which claims the benefit of U.S. Provisional Application No. 62/402,180 (filed Sep. 30, 2016). The content of which are incorporated by reference herein in their entirety.

TECHNICAL FIELD

The present invention relates to a radio terminal and a base station used in a mobile communication system.

BACKGROUND ART

In an LTE (Long Term Evolution) system which is a mobile communication system whose specification is formulated in 3GPP (3rd Generation Partnership Project), specified RRC (Radio Resource Control) states of a radio terminal (UE: User Equipment) include an RRC connected state and an RRC idle state.

A radio terminal in the RRC connected state is allocated with a radio resource from a base station (eNB: evolved Node-B) and communicates with the base station by using the allocated radio resource. On the other hand, a radio terminal in the RRC idle state performs a limited operation such as a paging reception. Thus, a process performed by the base station for the radio terminal is different depending on an RRC state of the radio terminal. Therefore, the RRC state of the radio terminal and an RRC state recognized by the base station should be matched.

SUMMARY

A radio terminal according to one embodiment comprises: a controller configured to detect a radio problem in communication with a base station in an RRC connected state and attempt a recovery from the radio problem; and a transmitter configured to transmit, to the base station, a polling signal for confirming whether or not the base station considers an RRC state of the radio terminal as the RRC connected state in response to the successful recovery. The controller maintains the RRC connected state in response to reception, from the base station, of a response signal to the polling signal.

A base station according to one embodiment comprises: a transmitter configured to perform initial transmission and retransmission of a downlink signal to a radio terminal; and a controller configured to determine whether or not the radio terminal is in an RRC connected state depending on whether or not a response signal to the downlink signal is received from the radio terminal. The transmitter performs the retransmission at least once after a lapse of a predetermined time period from the initial transmission. The predetermined time period is equal to or longer than a first time period set to the radio terminal by the base station. The first time period is a time period from when the radio terminal detects a radio problem in communication with the base station to when the radio terminal determines that a radio link failure occurs.

A radio terminal according to one embodiment comprises: a receiver configured to receive, from a base station, an RRC Connection Release message for instructing a shift from an RRC connected state to an RRC idle state; a transmitter configured to transmit, to the base station, a response message to the RRC Connection Release message in response to reception of the RRC Connection Release message; and a controller configured to shift from the RRC connected state to the RRC idle state in response to confirmation of a delivery of the response message.

DESCRIPTION OF THE EMBODIMENT

[Mobile Communication System]

(Configuration of Mobile Communication System)

Figure 1:
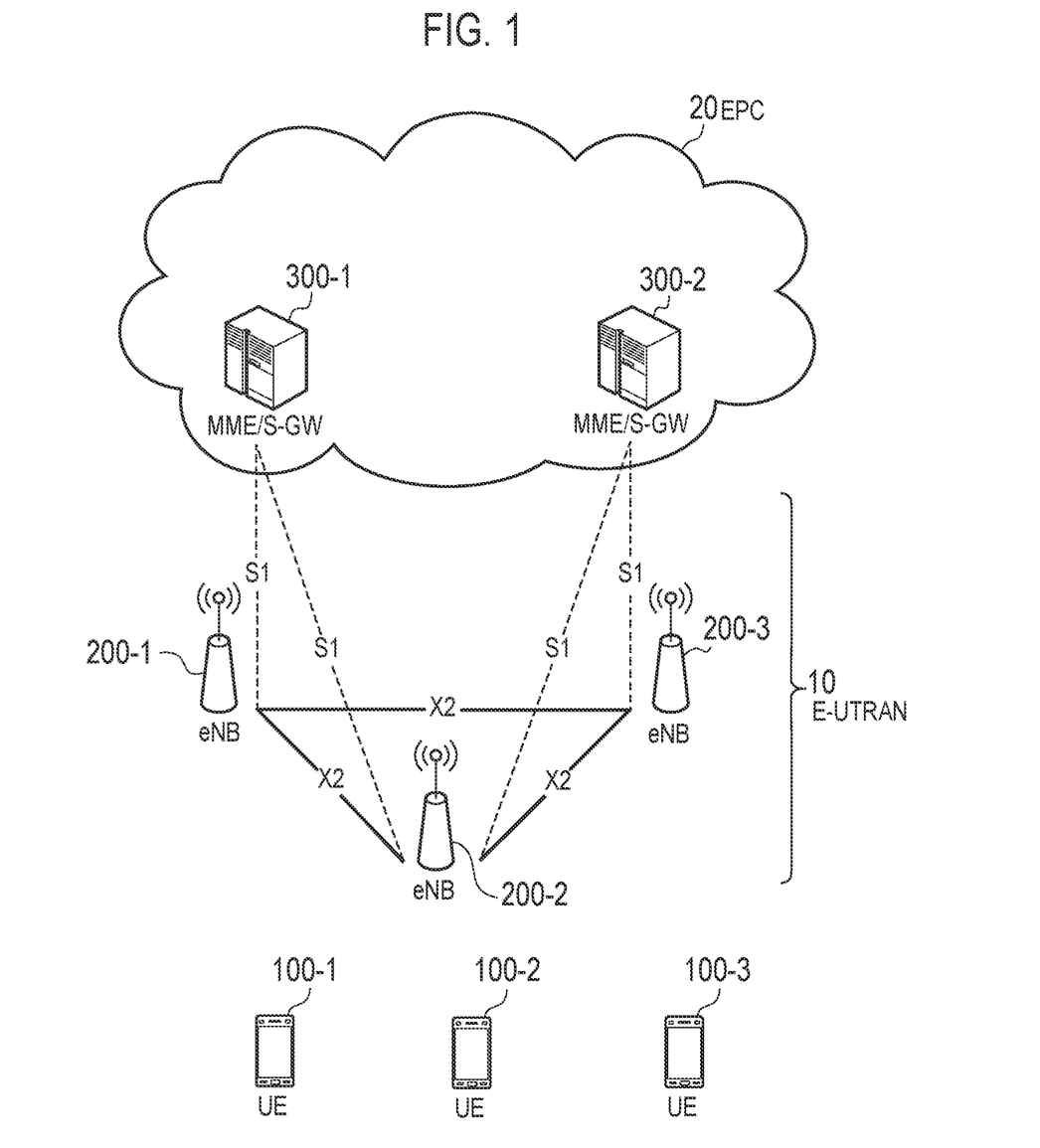
FIG. 1 is a diagram illustrating a configuration of an LTE system according to an embodiment.

Hereinafter, the configuration of the mobile communication system according to the embodiment will be described. FIG. 1 is a diagram illustrating a configuration of an LTE (Long Term Evolution) system which is a mobile communication system according to the embodiment. The LTE system is a mobile communication system based on the 3GPP standard.

As illustrated in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20.

The UE 100 is a mobile communication device. The UE 100 performs radio communication with the eNB 200 that manages a cell (serving cell) in which the UE 100 exists.

The E-UTRAN 10 includes base stations (evolved Node-Bs) 200. The eNB 200s are connected to each other via an X2 interface. The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter referred to simply as "data"), a measurement control function for mobility control/scheduling, and the like. "Cell" is used as a term indicating the minimum unit of radio communication area. "Cell" is also used as a term indicating a function or resource for performing radio communication with the UE 100.

The EPC 20 includes a mobility management entity (MME) and a serving gateway (S-GW) 300. The MME performs various mobility control and the like for the UE 100. The MME manages information of tracking area (TA) in which the UE 100 is located, by communicating with the UE 100 using NAS (Non-Access Stratum) signaling. The MME paging the UE 100 on a tracking area basis. The S-GW performs data transfer control. The MME and the S-GW are connected to the eNB 200 via an S1 interface.

Figure 2:
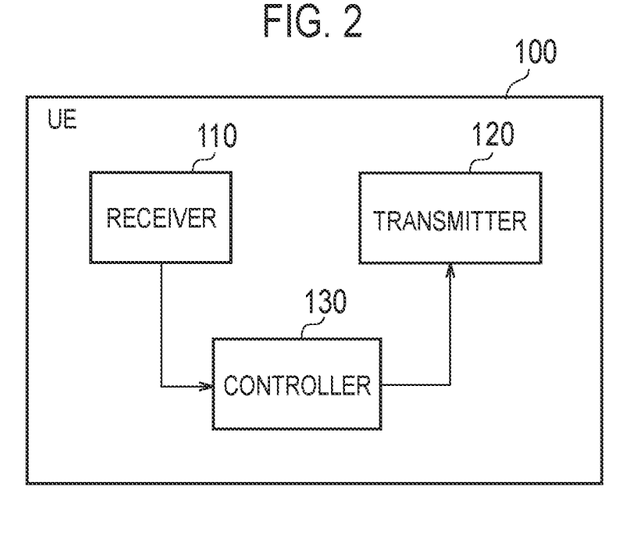
FIG. 2 is a diagram illustrating a configuration of a UE (radio terminal) according to the embodiment.

FIG. 2 is a diagram illustrating a configuration of a UE (radio terminal). As illustrated in FIG. 2, the UE 100 includes a receiver 110, a transmitter 120, and a controller 130.

The receiver 110 performs various types of reception under control of the controller 130. The receiver 110 includes antennas and a receiving machine. The receiving machine converts the radio signal received by the antennas into a baseband signal (reception signal). The receiving machine outputs the baseband signal to the controller 130.

The transmitter 120 performs various transmissions under control of the controller 130. The transmitter 120 includes antennas and a transmitting machine. The transmitting machine converts a baseband signal (transmission signal) output from the controller 130 into a radio signal and transmits it from the antennas.

The controller 130 performs various controls in the UE 100. The controller 130 includes at least one processor and memory. The memory stores programs executed by the processor and information used for processing by the processor. The processor may include a baseband processor and a CPU (Central Processing Unit). The baseband processor performs modulation and demodulation, encoding, decoding, and the like of the baseband signal. The CPU executes various processes by executing programs stored in the memory. The processor executes processes to be described later.

Figure 3:
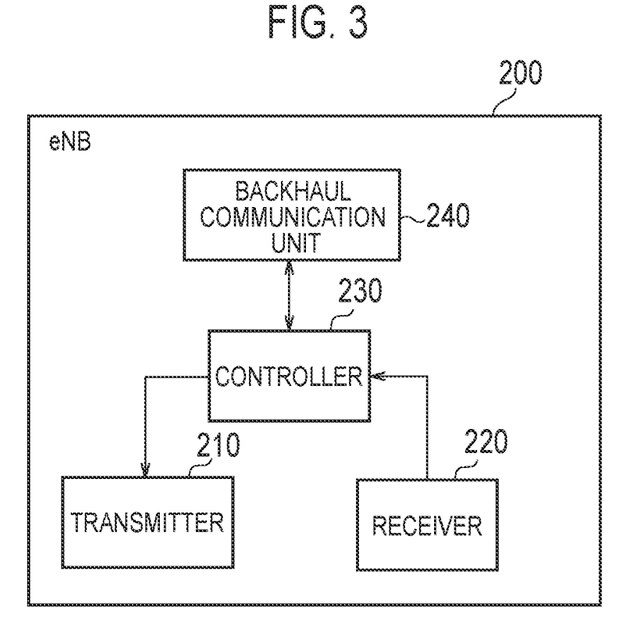
FIG. 3 is a diagram illustrating a configuration of an eNB (base station) according to the embodiment.

FIG. 3 is a diagram illustrating a configuration of an eNB (base station). As illustrated in FIG. 3, the eNB 200 includes a transmitter 210, a receiver 220, a controller 230, and a backhaul communication unit 240.

The transmitter 210 performs various transmissions under control of the controller 230. The transmitter 210 includes antennas and a transmitting machine. The transmitting machine converts a baseband signal (transmission signal) outputted by the controller 230 into a radio signal. The transmitting machine transmits the radio signal from the antennas.

The receiver 220 performs various types of reception under control of the controller 230. The receiver 220 includes antennas and a receiving machine. The receiving machine converts the radio signal received by the antennas into a baseband signal (received signal). The receiving machine outputs the baseband signal to the controller 230.

The controller 230 performs various controls in the eNB 200. The controller 230 includes at least one processor and memory. The memory stores programs executed by the processor and information used for processing by the processor. The processor may include a baseband processor and a CPU. The baseband processor performs modulation and demodulation, encoding, decoding, and the like of the baseband signal. The CPU executes various processes by executing programs stored in the memory. The processor executes processes to be described later.

The backhaul communication unit 240 is connected to the adjacent eNB 200 via the X2 interface and is connected to the MME/S-GW 300 via the S1 interface. The backhaul communication unit 240 is used for communication performed on the X2 interface, communication performed on the S1 interface, and the like.

Figure 4:
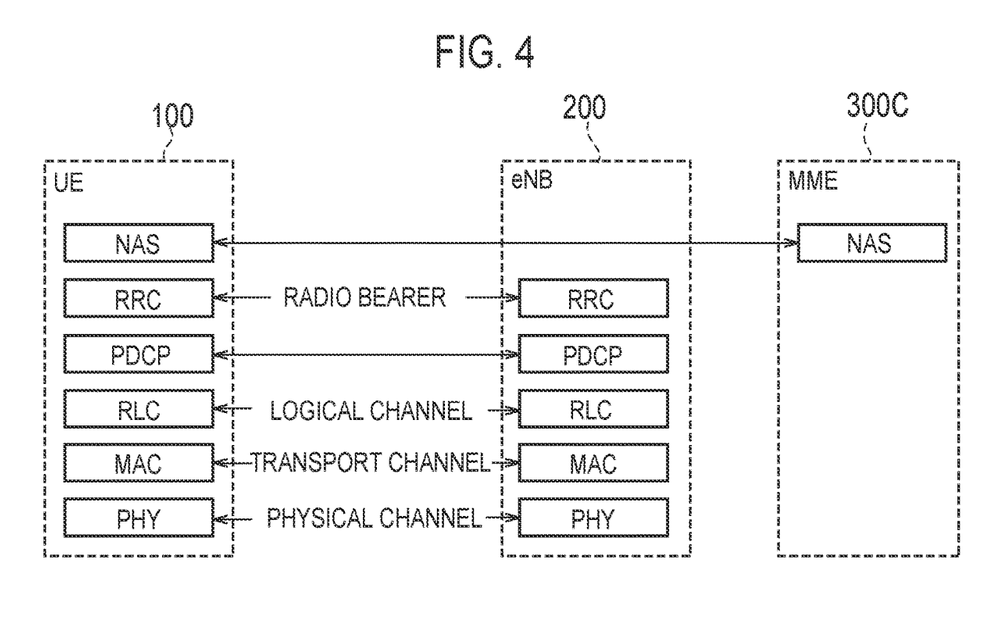
FIG. 4 is a diagram illustrating a configuration of a protocol stack of a radio interface in an LTE system according to the embodiment.

FIG. 4 is a diagram illustrating a configuration of a protocol stack of a radio interface. As illustrated in FIG. 4, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer. The PHY layer, the MAC layer, the RLC layer, the PDCP layer, and the RRC layer constitute an AS (Access Stratum) layer.

The PHY layer carries out coding/decoding, modulation/demodulation, antenna mapping/demapping, resource mapping/demapping. Between the PHY layer of the UE 100 and the PHY layer of the eNB 200, data and control information are transmitted via the physical channel.

The MAC layer performs priority control of data, retransmission processing by hybrid ARQ (HARQ), random access procedure, and the like. Between the MAC layer of the UE 100 and the MAC layer of the eNB 200, data and control information are transmitted via a transport channel. The MAC layer of the eNB 200 includes a scheduler that determines the uplink and downlink transport format (transport block size, modulation and coding scheme (MCS)) and the allocated resource block to the UE 100.

The RLC layer uses the functions of the MAC layer and the PHY layer to transmit data to the RLC layer on the receiving side. Between the RLC layer of the UE 100 and the RLC layer of the eNB 200, data and control information are transmitted via logical channels.

The PDCP layer carries out header compression/decompression, encryption/decryption.

The RRC layer is defined only in the control plane handling the control information. Between the RRC layer of the UE 100 and the RRC layer of the eNB 200, RRC signaling for various settings is transmitted. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected state. If there is not a connection (RRC connection) between the RRC of the UE 100 and the RRC of the eNB 200, the UE 100 is in the RRC idle state.

The NAS layer located above the RRC layer performs session management, mobility management, and the like. NAS signaling is transmitted between the NAS layer of the UE 100 and the NAS layer of the MME 300. In addition to the protocol of the radio interface, the UE 100 has a function such as an application layer.

Figure 5:
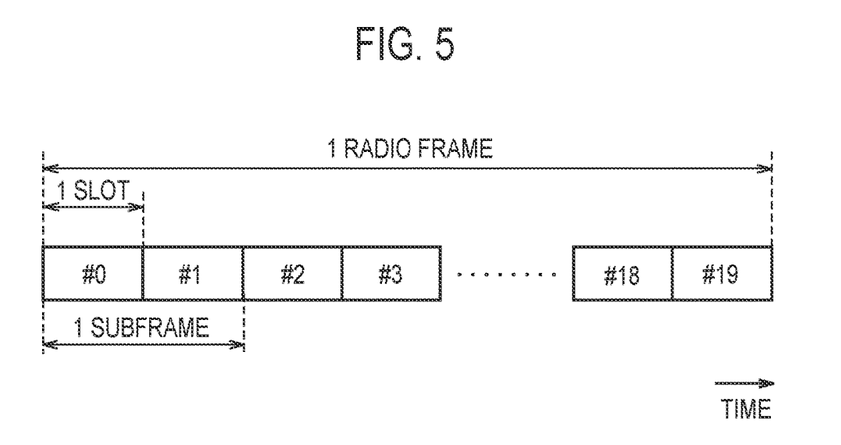
FIG. 5 is a diagram illustrating a configuration of a radio frame used in the LTE system.

FIG. 5 is a diagram illustrating a configuration of a radio frame used in the LTE system. As illustrated in FIG. 5, the radio frame is composed of ten subframes on the time axis. Each subframe is composed of two slots on the time axis. The length of each subframe is 1 ms. The length of each slot is 0.5 ms. Each subframe includes a plurality of resource blocks (RB) on the frequency axis. Each subframe includes a plurality of symbols on the time axis and includes a plurality of subcarriers on the frequency axis. Specifically, one RB is composed of twelve subcarriers and one slot. One symbol and one subcarrier constitute one resource element (RE). Among radio resources (time/frequency resources) allocated to the UE 100, frequency resources can be specified by resource blocks and time resources can be specified by subframes (or slots).

In the downlink, the section of the first several symbols of each subframe is a region used mainly as a physical downlink control channel (PDCCH) for transmitting downlink control information. The remaining part of each subframe is a region that can be mainly used as a physical downlink shared channel (PDSCH) for transmitting downlink data.

Basically, the eNB 200 transmits downlink control information (DCI) to the UE 100 using the PDCCH, and transmits the downlink data to the UE 100 using the PDSCH. The DCI carried by the PDCCH includes uplink scheduling information, downlink scheduling information, and TPC command. The uplink scheduling information is scheduling information (UL grant) related to allocation of uplink radio resources. The downlink scheduling information is scheduling information on allocation of downlink radio resources. The TPC command is information for instructing increase/decrease of uplink transmission power. The eNB 200 includes CRC bits scrambled with an identifier (RNTI: Radio Network Temporary ID) of the destination UE 100 in the DCI in order to identify the UE 100 as the transmission destination of the DCI. Each UE 100 performs blind decoding on the PDCCH by performing a CRC check on the DCI possibly addressed to the UE 100 with the RNTI of the UE 100, and detects the DCI addressed to the UE 100. The PDSCH carries downlink data by a downlink radio resource (resource block) indicated by the downlink scheduling information.

In the uplink, both end portions in the frequency direction in each subframe are mainly used as a physical uplink control channel (PUCCH) for transmitting uplink control information. The remaining part of each subframe is a region that can be mainly used as a physical uplink shared channel (PUSCH) for transmitting uplink data.

Basically, the UE 100 transmits uplink control information (UCI) to the eNB 200 by using the PUCCH, and transmits the uplink data to the eNB 200 by using the PUSCH. The UCI carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating downlink channel quality. The CQI is used for, for example, determining the MCS to be used for downlink transmission. The PMI is an index indicating a precoder matrix preferably used for the downlink transmission. The RI is an index indicating the number of layers (the number of streams) that can be used for the downlink transmission. The SR is information for requesting an allocation of a PUSCH resource. The HARQ ACK/NACK is delivery acknowledgement information indicating whether or not downlink data is correctly received.

[Mismatch of RRC State]

In the mobile communication system described above, a mismatch in an RRC state of a UE may occur between the UE and an eNB.

Figure 6:
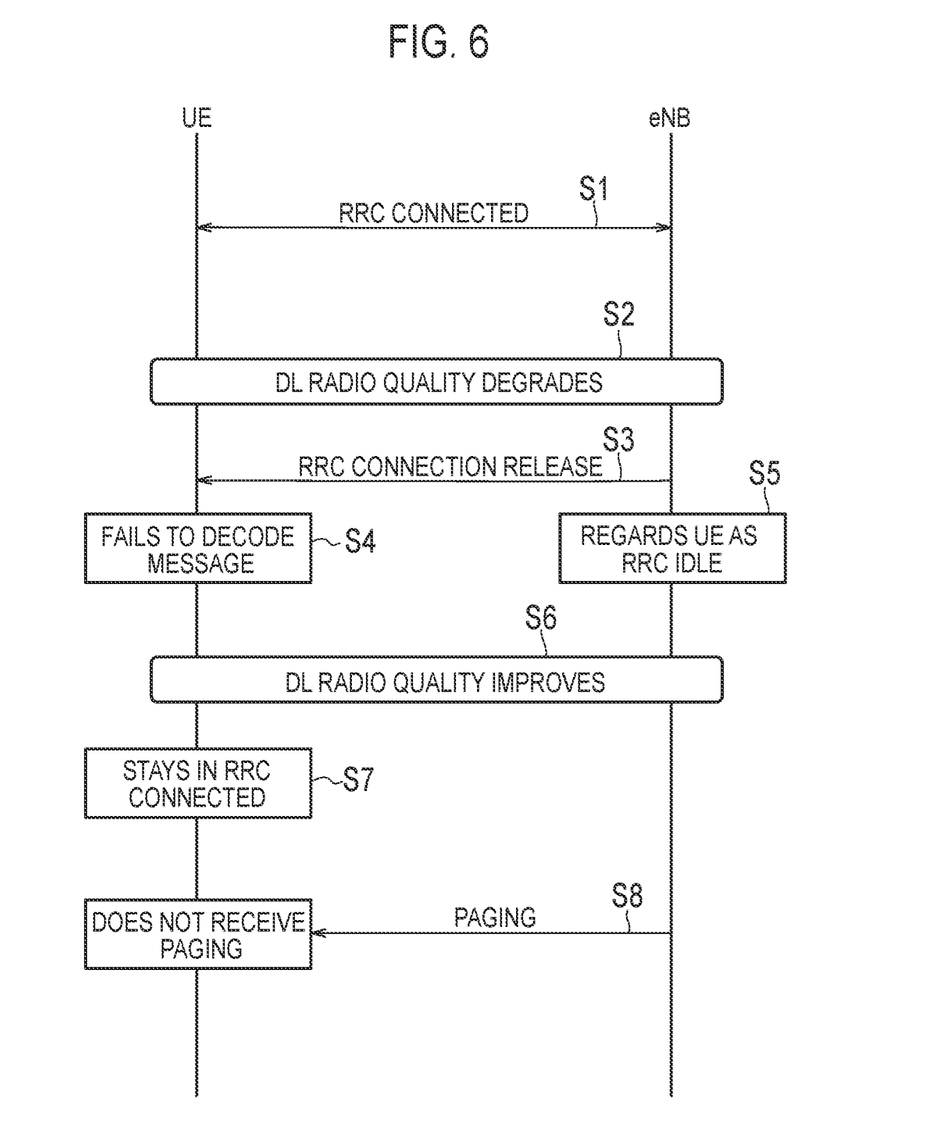
FIG. 6 is a flowchart illustrating an example of a scenario in which a mismatch of an RRC state occurs.

FIG. 6 is a flowchart illustrating an example of a scenario in which a mismatch of an RRC state occurs. The RRC state of the UE is an RRC connected state (step S1).

As illustrated in FIG. 6, a downlink radio quality (DL radio quality) between the UE and the eNB degrades in step S2. The eNB may detect the degradation, based on a CQI feedback or the like from the UE. The UE detects a radio problem in response to the degradation of the downlink radio quality.

In step S3, the eNB transmits, to the UE, an RRC Connection Release message instructing a shift from the RRC connected state to the RRC idle state.

In step S4, the UE fails to decode the RRC Connection Release message due to the degradation of the downlink radio quality. In other words, the UE cannot receive the RRC Connection Release message because the radio problem is occurring. While the radio problem is occurring, the UE cannot know whether or not the eNB has transmitted the RRC Connection Release message.

In step S5, the eNB considers that the UE has shifted to the RRC idle state in response to the transmission of the RRC Connection Release message. Here, the eNB may perform a retransmission process of the RRC Connection Release message (downlink signal) in the MAC layer or the RLC layer. As an example, the RLC layer performs retransmission by ARQ. If the delivery of the RRC Connection Release message is not confirmed even if a maximum retransmission count has been reached (that is, if ACK is not received from the UE), the eNB may consider that the UE has shifted to the RRC idle state. In other words, the eNB determines that a radio link failure (RLF) has occurred in the UE as a result of the RLC reaching an RLC retransmission upper limit, and determines that the UE has shifted to the RRC idle state.

In step S6, the downlink radio quality between the UE and the eNB improves. The eNB, which recognizes that the UE is in the RRC idle state, does not recognize that the downlink radio quality improves.

In step S7, as a result of the improvement of the downlink radio quality, the UE recovers from the radio problem and maintains the RRC connected state. That is, as a result of recovering from the radio problem, the UE maintains the RRC connected state without detecting the RLF.

In step S8, the eNB transmits a Paging message to the UE according to a procedure of the RRC idle state. However, actually, the UE is in the RRC connected state and does not operate according to the procedure of the RRC idle state, and thus, the UE fails to receive the Paging message. As a result, a situation where the paging of the UE is disabled occurs.

Figure 7:
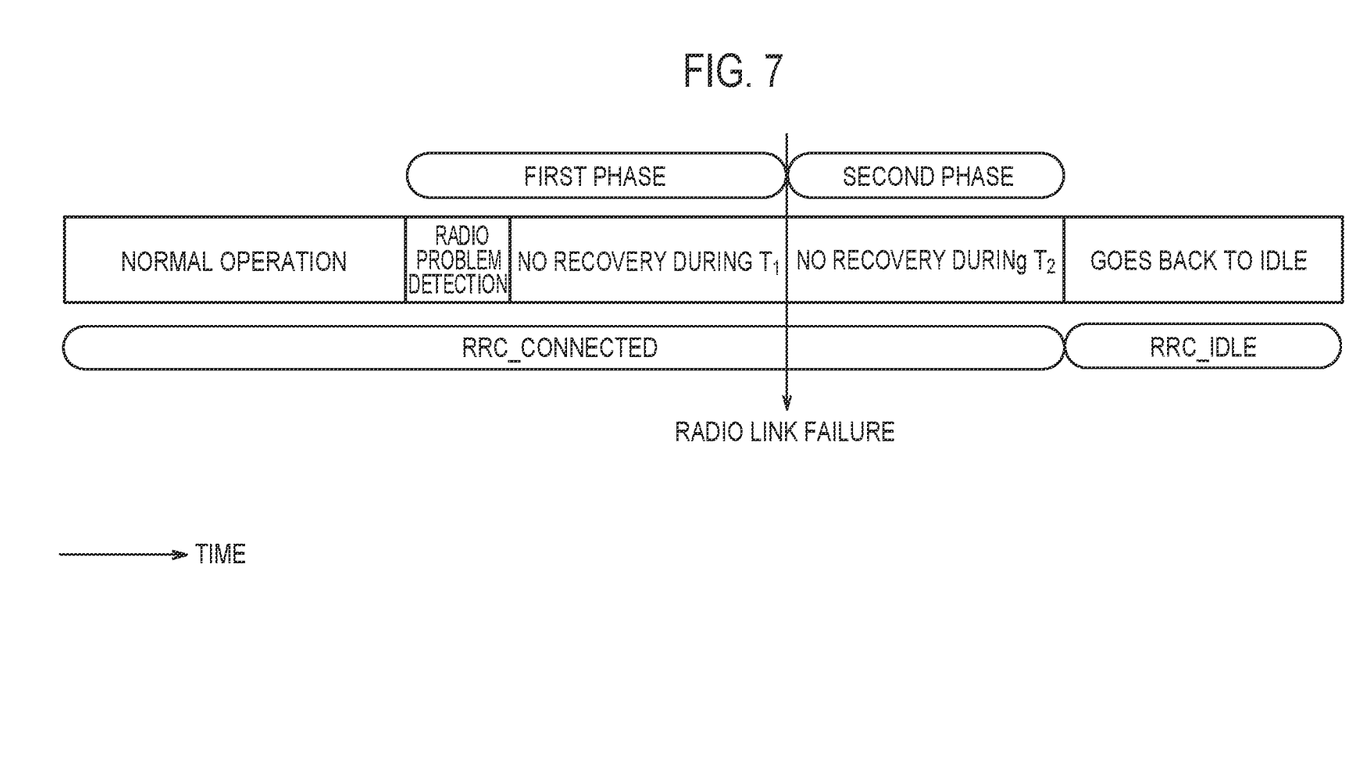
FIG. 7 is a diagram illustrating an operation of the UE when a radio problem occurs.

FIG. 7 is a diagram illustrating an operation of the UE when the radio problem occurs.

As illustrated in FIG. 7, during a normal operation, the UE in the RRC connected state detects the radio problem in response to reception of an "out of sync" indication from a lower layer for a predetermined successive number of times and starts a timer T310. A value of the timer T310 ("$T_1$" time illustrated in FIG. 7) can be set from the eNB to the UE by an SIB (system information block). During the operation of the timer T310, the UE detects the recovery from the radio problem in response to reception of an "in sync" indication from the lower layer for a predetermined successive number of times, and stops the timer T310. On the other hand, if the timer T310 expires without detecting the recovery from the radio problem, the UE determines that the radio link failure (RLF) has occurred. A stage from the detection of the radio problem to the detection of the RLF is called First Phase. During the First Phase, the UE maintains the RRC connected state and maintains the radio resource setting.

Next, upon detecting the RLF, the UE starts an RRC connection reestablishment procedure and starts a timer T311. A value of the timer T311 ("$T_2$" time illustrated in FIG. 7) can be set by the SIB from the eNB to the UE. During the operation of the timer T311, the UE performs a cell selection operation to stop the timer T311 in response to an appropriate cell being selected, and transmits an RRC connection reestablishment request message to the cell. On the other hand, if the timer T311 expires without selecting an appropriate cell, the UE shifts from the RRC connected state to the RRC idle state. A stage from the detection of the RLF to the shift to the RRC idle state is called Second Phase.

First Embodiment

A first embodiment will be described below.

The UE 100 according to the first embodiment includes the controller 130 configured to detect a radio problem in communication with the eNB 200 in the RRC connected state and attempt a recovery from a radio problem, and the transmitter 120 configured to transmit to the eNB 200 a polling signal for confirming whether or not the eNB 200 considers the RRC state of the UE 100 as the RRC connected state in response to the successful recovery. The controller 130 maintains the RRC connected state in response to reception of a response signal to the polling signal from the eNB 200. The polling signal may be a polling message transmitted and received in an upper layer (for example, MAC, RLC, PDCP, or RRC) of the physical layer. Alternatively, a scheduling request (SR) transmitted and received in the physical layer may be used as the polling signal. Alternatively, in the physical layer, a signal different from the SR and transmitted through PUCCH or PUSCH may be used as the polling signal. If the recovery from the radio problem is detected in the upper layer, the lower layer (for example, the physical layer) may be instructed from the upper layer to transmit the polling signal.

As a result, after recovering from the radio problem, the UE 100 can confirm whether or not the eNB 200 considers the RRC state of the UE 100 as the RRC connected state. Then, if receiving the response signal to the polling signal from the eNB 200, the UE 100 can recognize that the eNB 200 considers the RRC state of the UE 100 as the RRC connected state and maintain the RRC connected state. Therefore, it is possible to prevent a mismatch in the RRC state of the UE 100 between the UE 100 and the eNB 200 from occurring.

In the first embodiment, the transmitter 120 of the UE 100 transmits the polling signal to the eNB 200 in response to the successful recovery from the radio problem, regardless of the presence or absence of uplink data to be transmitted to the eNB 200.

Here, if there is uplink data to be transmitted to the eNB 200, a general UE 100 transmits a scheduling request (SR) to the eNB 200. If the eNB 200 considers the RRC state of the UE 100 as the RRC connected state, the UE 100 can maintain the RRC connected state because an uplink resource is allocated from the eNB 200. However, the presence of uplink data is required for the transmission of the SR, if there is no uplink data to be transmitted to the eNB 200, such a method cannot be applied. Therefore, in the first embodiment, the UE 100 transmits the polling signal to the eNB 200 in response to the successful recovery from the radio problem even if there is no uplink data to be transmitted to the eNB 200. Accordingly, the first embodiment can also be applied to a case where there is no uplink data to be transmitted to the eNB 200.

In the first embodiment, if not receiving the response signal within a first predetermined time period from when the polling signal is transmitted or when the polling signal is determined to be transmitted, the controller 130 of the UE 100 shifts from the RRC connected state to the RRC idle state.

Here, if the UE 100 does not receive the response signal to the polling signal, the UE 100 can recognize that the eNB 200 considers the RRC state of the UE 100 as the RRC idle state. Therefore, in such a case, the UE 100 can shift from the RRC connected state to the RRC idle state to prevent a mismatch in the RRC state of the UE 100 between the UE 100 and the eNB 200.

In the first embodiment, the first predetermined time period may be set from the eNB 200 to the UE 100. The eNB 200 may set the first predetermined time period to the UE 100 by broadcast signaling (for example, an SIB), or may set the first predetermined time period to the UE 100 by dedicated signaling (for example, an RRC Connection Reconfiguration message) addressed to the UE 100.

In the UE 100 according to the first embodiment, the controller 130 may determine whether or not an elapsed time period from detection of the radio problem until a success of the recovery is longer than a second predetermined time period. The transmitter 120 may transmit the polling signal to the eNB 200 in response to the successful recovery from the radio problem only if the elapsed time period exceeds the second predetermined time period. The controller 130 may determine the second predetermined time period, based on a duration during which the eNB 200 continues the retransmission to the UE 100.

Here, if the UE 100 detects the radio problem, the eNB 200 performs a retransmission process of a downlink signal (for example, the RRC Connection Release). While the eNB 200 continues the retransmission, since the eNB 200 considers the RRC state of the UE 100 as the RRC connected state, it is not necessary to transmit the polling signal. Therefore, the UE 100 activates the transmission of the polling signal only if the elapsed time period from detection of the radio problem until a success of the recovery exceeds the second predetermined time period. As a result, unnecessary transmission of the polling signal can be prevented.

Figure 8:
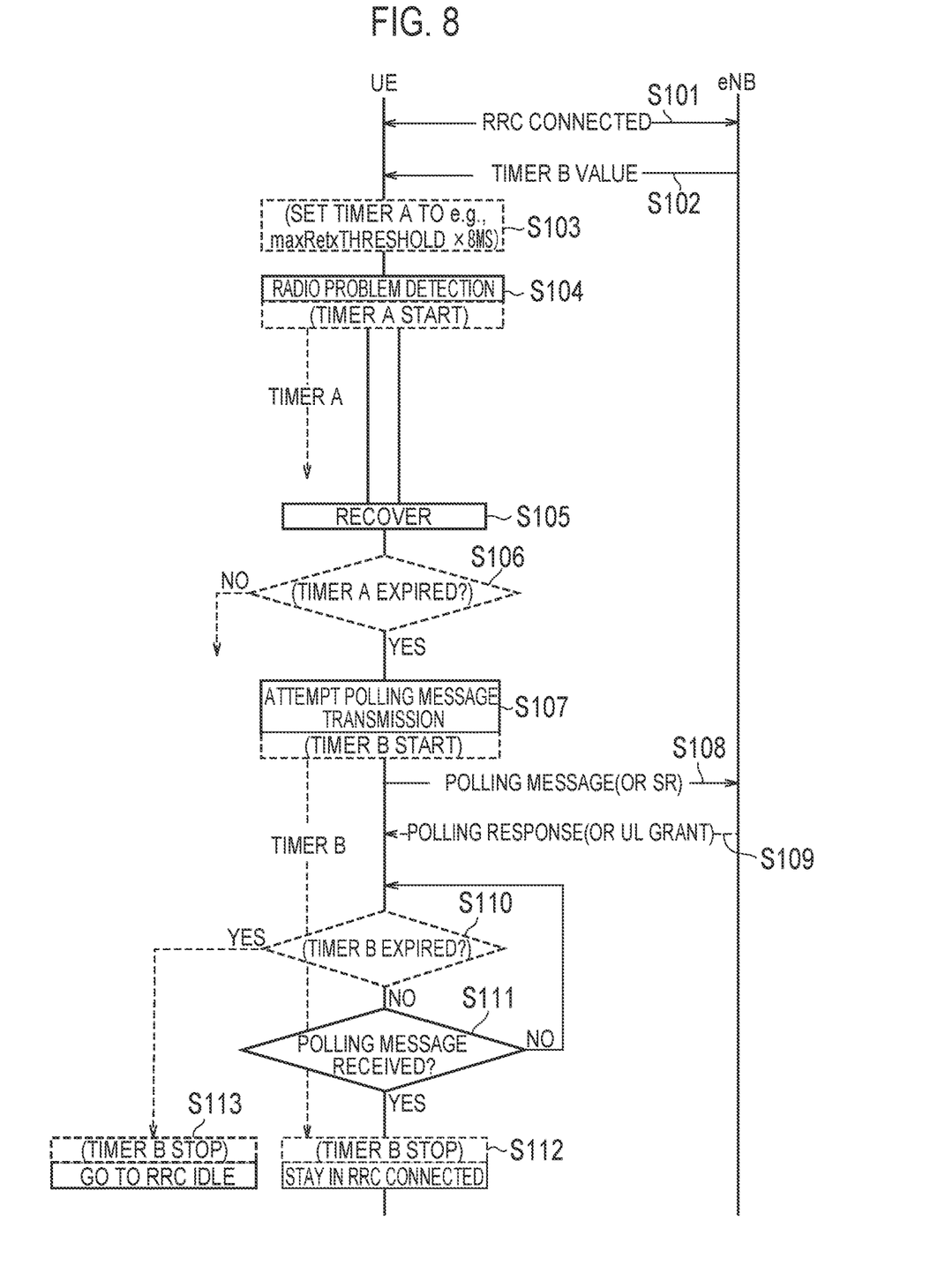
FIG. 8 is a flowchart illustrating an operation example according to a first embodiment.

FIG. 8 is a flowchart illustrating an operation example according to the first embodiment. A process indicated by a broken line in FIG. 8 illustrates an unessential process. The RRC state of the UE 100 is the RRC connected state (step S101).

As illustrated in FIG. 8, in step S102, the eNB 200 transmits a timer value (Timer B value) corresponding to the first predetermined time period, to the UE 100. The UE 100 stores a timer value (Timer B value) received from the eNB 200.

In step S103, the UE 100 sets a timer value (Timer A value) corresponding to the second predetermined time period. As an example, the UE 100 determines the second predetermined time period, based on the duration during which the eNB 200 continues the retransmission to the UE 100. Here, as the retransmission process, ARQ retransmission in the RLC layer is assumed. The eNB 200 performs the retransmissions within a range up to the maximum retransmission count at previously defined time intervals (for example, 8 ms intervals). A parameter (maxRetxThreshold) indicating the maximum retransmission count is set from the eNB 200 to the UE 100. As an example, if the maximum retransmission count is four, the UE 100 sets 4 times×8 ms=32 ms as the timer value (Timer A value).

In step S104, the downlink radio quality (DL radio quality) between the UE 100 and the eNB 200 deteriorates. The UE 100 detects the radio problem as a result of the deterioration of the downlink radio quality. Upon detecting the radio problem, the UE 100 starts a timer (Timer A) corresponding to the second predetermined time period.

In step S105, the downlink radio quality between the UE 100 and the eNB 200 improves. The UE 100 recovers from the radio problem as a result of the improvement of the downlink radio quality.

In step S106, the UE 100 confirms whether or not the timer (Timer A) corresponding to the second predetermined time period has expired.

If the timer (Timer A) has expired (step S106: YES), the UE 100 determines transmission of the polling signal in step S107. Here, the UE 100 starts a timer (Timer B) corresponding to the first predetermined time period. That is, the UE 100 starts the timer (Timer B) upon attempting to transmit the polling signal. Alternatively, the UE 100 may start the timer (Timer B) upon transmitting the polling signal.

In step S108, the UE 100 transmits the polling signal to the eNB 200. The polling signal is the polling message or the SR. As an example, the polling message includes at least one of RRC Transaction ID, Cause Value, timing information on occurrence and/or recovery of the radio problem, and an identifier of the UE (for example, C-RNTI). For example, the Cause Value is information such as "recovery from the radio problem (Radio problem recovery)" or "the radio problem continuing over a timer A period (Radio problem longer than threshold)". The timing information may be a subframe number or a system frame number (SFN), or a combination thereof (for example, SFN×10+subframe #).

In step S109, if considering the RRC state of the UE 100 as the RRC connected state, the eNB 200 transmits the response signal to the polling signal, to the UE 100. The response signal is a polling response or a UL grant. The UL grant indicates an uplink resource allocated by the eNB 200 to the UE 100. On the other hand, if considering the RRC state of the UE 100 as the RRC idle state, the eNB 200 does not notice the polling signal and therefore does not transmit the response signal to the UE 100. As an example, the polling response includes at least one of an RRC Transaction ID, an IE with an indication of being in RRC Connected, an identifier of the UE (for example, C-RNTI), and a current DL retransmission count of the eNB. The IE with an indication of being in RRC Connected is, for example, an IE such as "Still-connected ENUM (true) OPTIONAL". The current DL retransmission count of the eNB is used to prevent a recognition misunderstanding in retransmission count with the UE 100 if the eNB 200 has repeated the DL transmission during the radio problem.

If the UE 100 receives the response signal (step S111: YES) before the timer (Timer B) expires (step S110: NO), the UE 100 maintains the RRC connected state in step S112. Further, the UE 100 stops the timer (Timer B).

On the other hand, if the timer (Timer B) has expired without the UE 100 receiving the response signal (step S110: YES), the UE 100 shifts from the RRC connected state to the RRC idle state in step S113. Further, the UE 100 stops the timer (Timer B).

It is noted that the UE 100 may be prohibited from re-transmitting the polling signal while the timer (Timer B) is in operation. As a result of not re-transmitting the polling signal while the timer B is in operation, an amount of signaling can be reduced. Further, if the timer (Timer B) expires, the UE 100 may transmit the polling signal again in response to detecting at least one radio problem during the operation of the timer and the recovery of the radio problem. If assuming a case where the UE 100 cannot receive the response signal as a result of the occurrence of the radio problem while the Timer B is in operation, the UE 100 cannot understand whether or not to continue to maintain the RRC connected state. Therefore, if the radio problem occurs while the Timer B is in operation and the UE 100 cannot receive the response signal even after the Timer B expires, the UE 100 may transmit the polling signal again instead of shifting to the RRC idle state.

It is noted that the Timer B is a timer configured to define a waiting time period of the response signal, but a timer configured to define a transmission prohibition time period of the polling signal may be used in addition to the Timer B. The other timer may be started at the same timing as the Timer B or may be started at a timing different from the Timer B.

Second Embodiment

A second embodiment will be described while focusing on differences from the first embodiment, below. In the first embodiment, the problem of mismatch of the RRC state is solved by the process by the UE 100. On the other hand, the second embodiment is an embodiment in which the problem of mismatch of the RRC state is solved by a process by the eNB 200.

The eNB 200 according to the second embodiment includes a transmitter 210 configured to perform initial transmission and retransmission of a downlink signal to the UE 100, and the controller 230 configured to determine whether or not the UE 100 is in the RRC connected state depending on whether or not a response signal to the downlink signal is received from the UE 100. The transmitter 210 performs at least one retransmission after a lapse of a predetermined time period from the initial transmission. The predetermined time period is equal to or longer than a time period from when the UE 100 detects the radio problem in communication with the eNB 200 until when the UE 100 determines the radio link failure (RLF) (that is, the value of the timer T310). The predetermined time period may be a time period from when the UE 100 detects the radio problem in communication with the eNB 200 until when the UE 100 shifts to the RRC idle state (that is, a total value of the timer T310 and the timer T311).

Figure 9:
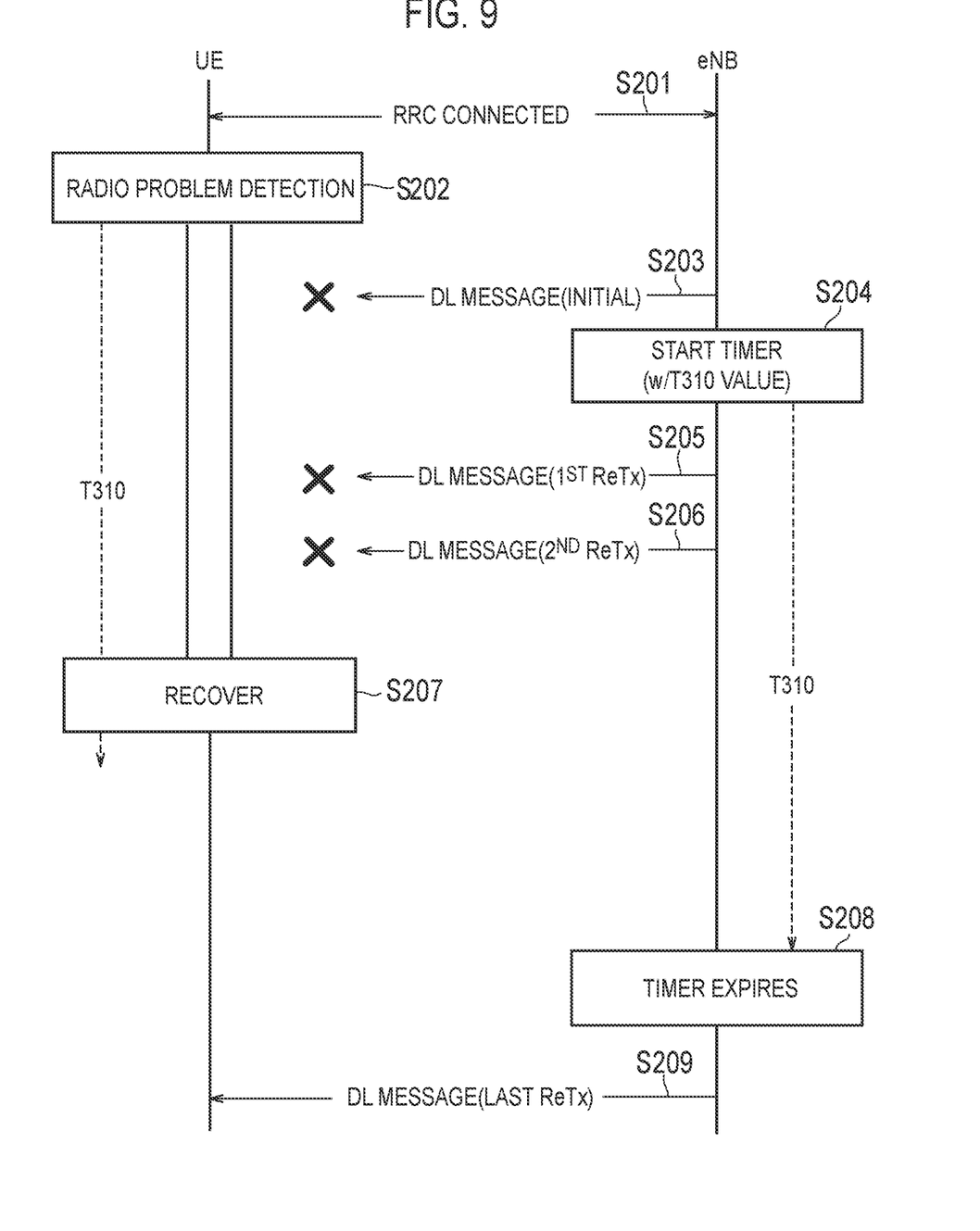
FIG. 9 is a flowchart illustrating an operation example according to a second embodiment.

FIG. 9 is a flowchart illustrating an operation example according to the second embodiment. A process indicated by a broken line in FIG. 9 illustrates an unessential process. The RRC state of the UE 100 is the RRC connected state (step S201). Here, an example in which maxRetxThreshold is "4" (four retransmissions) will be described.

As illustrated in FIG. 9, in step S202, the downlink radio quality between the UE 100 and the eNB 200 deteriorates. The UE 100 detects the radio problem as a result of the detects of the downlink radio quality and starts the timer T310.

In step S203, the eNB 200 performs an initial transmission of a downlink signal to the UE 100. The downlink signal may be an RRC Connection Release message. Here, since the UE 100 has not recovered from the radio problem, the UE 100 fails to receive the downlink signal and does not transmit the ACK (ARQ ACK) to the eNB 200.

In step S204, the eNB 200 starts a timer at the time of the initial transmission. To the timer, the value of the timer T310 set to the UE 100 is set (w/T310 value, where "w/" denotes an abbreviation of "with"). Alternatively, the total value of the timers T310 and T311 set to the UE 100 may be set to the timer. At the time of an initial transmission of PDU (Protocol Data Unit) corresponding to the downlink signal, the eNB 200 sets a counter (RETX_COUNT) indicating the retransmission count to zero.

In step S205, in response to not receiving the ACK from the UE 100, the eNB 200 performs a first retransmission (1st ReTx) of the downlink signal. Further, the eNB 200 increments the counter (RETX_COUNT). Since the UE 100 has not yet recovered from the radio problem, the UE 100 fails to receive the downlink signal and does not transmit ACK to the eNB 200.

In step S206, the eNB 200 performs a second retransmission (2nd ReTx) of the downlink signal in response to not receiving ACK from the UE 100. Further, the eNB 200 increments the counter (RETX_COUNT). Since the UE 100 has not yet recovered from the radio problem, the UE 100 fails to receive the downlink signal and does not transmit ACK to the eNB 200.

On the other hand, in step S207, the UE 100 recovers from the radio problem while the timer T310 is in operation and maintains the RRC connected state.

In step S208, the eNB 200 detects that the timer set in step S204 has expired.

In step S209, the eNB 200 performs a retransmission (last ReTx) of the downlink signal, that is, a last retransmission, in response to expiration of the timer. Further, the eNB 200 increments the counter (RETX_COUNT). As a result of the last retransmission, the counter (RETX_COUNT) reaches maxRetxThreshold. As an example, if the timer T310 is set to 50 ms, the eNB 200 performs the last retransmission after a lapse of 50 ms from the initial transmission.

If delivery of the last retransmission is confirmed (that is, if ACK is received from the UE 100), the eNB 200 recognizes that the UE 100 is in the RRC connected state. On the other hand, the eNB 200 recognizes that the UE 100 is in the RRC idle state if the delivery of the last retransmission is not confirmed (that is, if ACK is not received from the UE 100). Therefore, the eNB 200 can correctly recognize the RRC state of the UE 100.

It is noted that in FIG. 9, although the eNB 200 performs the last retransmission after expiration of the timer, the eNB 200 may perform a third retransmission (and the last retransmission) after the expiration of the timer, in addition to the last retransmission.

Third Embodiment

A third embodiment will be described while focusing on differences from the first and second embodiments below. The third embodiment is an embodiment where the problem of mismatch of the RRC state is resolved by introducing a response message to the RRC Connection Release message.

The UE 100 according to the third embodiment includes the receiver 110 configured to receive from the eNB 200 the RRC Connection Release message for instructing a shift from the RRC connected state to the RRC idle state, the transmitter 120 configured to transmit a response message to the RRC Connection Release message to the eNB 200 in response to reception of the RRC connection release message, and the controller 130 configured to shift from the RRC connected state to the RRC idle state in response to confirmation of the response message delivery.

In the third embodiment, the RRC Connection Release message may include instruction information indicating that transmission of the response message is necessary. The transmitter 120 of the UE 100 may transmit the response message to the eNB 200 in response to reception of the RRC Connection Release message including the instruction information.

Figure 10:
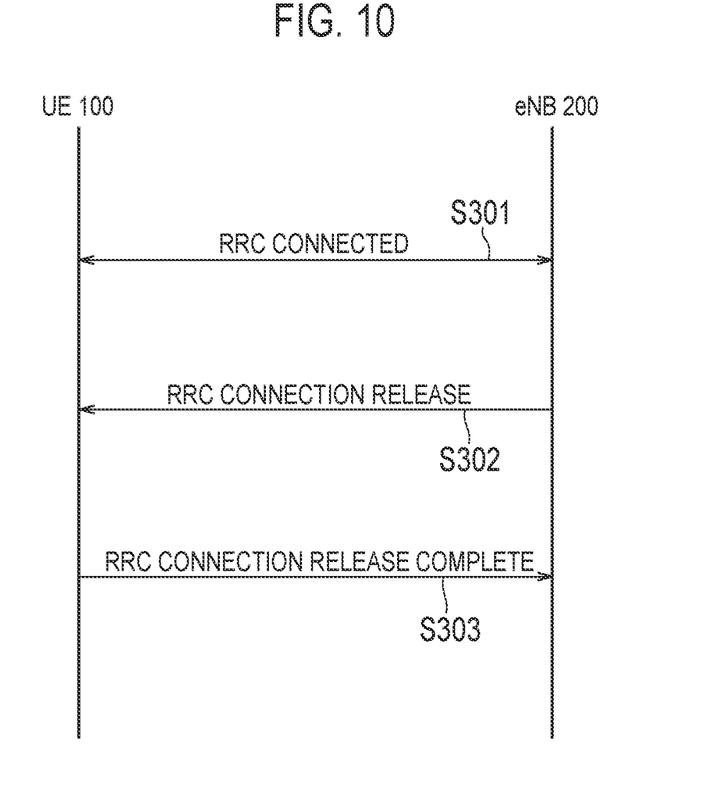
FIG. 10 is a flowchart illustrating an operation example according to a third embodiment.

FIG. 10 is a flowchart illustrating an operation example according to the third embodiment. The RRC state of the UE 100 is the RRC connected state (step S301). Prior to the present operation, the UE 100 may transmit to the eNB 200 UE capability information indicating that the UE 100 supports transmission of the response message. Based on the UE capability information, the eNB 200 may recognize that the UE 100 supports the transmission of the response message.

As illustrated in FIG. 10, in step S302, the eNB 200-2 transmits the RRC Connection Release message to the UE 100. The RRC Connection Release message may include instruction information indicating that transmission of a response message (RRC Connection Release Complete message) is necessary.

In step S303, the UE 100 transmits the response message (RRC Connection Release Complete message) to the eNB 200 in response to successful reception of the RRC Connection Release message. The response message may include an RRC Transaction ID. If confirming the delivery of the response message (for example, if receiving the HARQ/ARQ ACK from the eNB 200), the UE 100 shifts from the RRC connected state to the RRC idle state. Further, in response to the successful reception of the response message, the eNB 200 recognizes that the UE 100 has shifted from the RRC connected state to the RRC idle state.

On the other hand, if not being able to confirm the delivery of the response message (for example, if not receiving from the eNB 200 the HARQ/ARQ ACK), the UE 100 maintains the RRC connected state. Further, in response to failing to receive the response message, the eNB 200 recognizes that the UE 100 maintains the RRC connected state. Therefore, the eNB 200 can correctly recognize the RRC state of the UE 100.

Alternatively, if failing to receive the response message, the eNB 200 may perform both a process of assuming that the UE 100 is in the RRC connected state and a process of assuming that the UE 100 is in the RRC idle state. As an example, the eNB 200 may perform both transmission of the paging message for the RRC idle state and transmission of the RRC Connection Release message. These messages may be integrated into one. As an example, the paging message including information for the RRC Connection Release may be transmitted, or the RRC Connection Release message including information for the paging may be transmitted.

Other Embodiments

Each of the above-described embodiments may be implemented independently; two or more embodiments may be combined and implemented. For example, a part of the operation according to one embodiment may be added to another embodiment. Alternatively, a part of the operation according to one embodiment may be replaced by a part of the operation of another embodiment.

In each of the embodiments described above, the LTE system is exemplified as the mobile communication system. However, the present invention is not limited to the LTE system. The present invention may be applied to a system other than the LTE system.

In each of the embodiments described above, an example for the RRC connected state and the RRC idle state is described, but the present invention is not limited thereto. For example, instead of the RRC idle state, the present invention may be applied to a state where data communication is temporarily inactive (may be referred to as Light Connected or Inactive). In this case, instead of the RRC Connection Release, a message instructing a shift to the inactive state may be used.

INDUSTRIAL APPLICABILITY

The present invention is useful in the field of mobile communication.

The invention claimed is:

1. A radio terminal for a mobile communication system, comprising:
   a controller configured to detect a radio problem in communication with a base station in an RRC (Radio Resource Control) connected state; and
   a transmitter configured to transmit, to the base station, a polling signal for confirming whether or not the base station considers an RRC state of the radio terminal as the RRC connected state, in response to a successful recovery from the radio problem, wherein
the controller is configured to maintain the RRC connected state in response to reception, from the base station, of a response signal to the polling signal,
wherein
the controller is configured to:
  be set, from the base station, a first timer used for determining whether to shift from the RRC connected state to an RRC idle state;
  determine a value of a second timer used for determining whether to transmit the polling signal based on a duration during which the base station continues retransmission to the radio terminal;
  start the second timer when detecting the radio problem;
  transmit the polling signal when the second timer is expired before the successful recovery from the radio problem;
  start the first timer when transmitting the polling signal; and
  shift from the RRC connected state to the RRC idle state when the first timer is expired without receiving the response signal to the polling signal.

2. The radio terminal according to claim 1, wherein the controller is configured to:
  determine whether to detect the radio problem in communication with the base station during running the first timer;
  when determining not to detect the radio problem during the first timer running, shift from the RRC connected state to the RRC idle state when the first timer is expired without receiving the response signal to the polling signal; and
  when determining to detect the radio problem during the first timer running, retransmit the polling signal without shifting from the RRC connected state to the RRC idle state even when the first timer is expired without receiving the response signal to the polling signal.

3. A method comprising:
  detecting, by a radio terminal for a mobile communication system, a radio problem in communication with a base station in an RRC (Radio Resource Control) connected state;
  transmitting, by the radio terminal, to the base station, a polling signal for confirming whether or not the base station considers an RRC state of the radio terminal as the RRC connected state, in response to a successful recovery from the radio problem;
  maintaining, by the radio terminal, the RRC connected state in response to reception, from the base station, of a response signal to the polling signal;
  being set, from the base station, a first timer used for determining whether to shift from the RRC connected state to an RRC idle state;
  determining a value of a second timer used for determining whether to transmit the polling signal based on a duration during which the base station continues retransmission to the radio terminal;
  starting the second timer when detecting the radio problem;
  transmitting the polling signal when the second timer is expired before the successful recovery from the radio problem;
  starting the first timer when transmitting the polling signal for confirming whether or not the base station considers the RRC state of the radio terminal as the RRC connected state is transmitted; and
  shifting from the RRC connected state to the RRC idle state when the first timer is expired without receiving the response signal to the polling signal.

4. A processor controlling a radio terminal for a mobile communication system, the processor configured to execute:
  a process of detecting a radio problem in communication with a base station in an RRC (Radio Resource Control) connected state;
  a process of transmitting, to the base station, a polling signal for confirming whether or not the base station considers an RRC state of the radio terminal as the RRC connected state, in response to a successful recovery from the radio problem;
  a process of maintaining the RRC connected state in response to reception, from the base station, of a response signal to the polling signal;
  a process of being set, from the base station, a first timer used for determining whether to shift from the RRC connected state to an RRC idle state;
  a process of determining a value of a second timer used for determining whether to transmit the polling signal based on a duration during which the base station continues retransmission to the radio terminal;
  a process of starting the second timer when detecting the radio problem;
  a process of transmitting the polling signal when the second timer is expired before the successful recovery from the radio problem;
  a process of starting the first timer when transmitting the polling signal for confirming whether or not the base station considers the RRC state of the radio terminal as the RRC connected state is transmitted; and
  a process of shifting from the RRC connected state to the RRC idle state when the first timer is expired without receiving the response signal to the polling signal.

* * * * *